May 23, 1939.  O. SCHILLING  2,159,863
ENGINE GOVERNOR
Filed Feb. 21, 1935   3 Sheets-Sheet 1
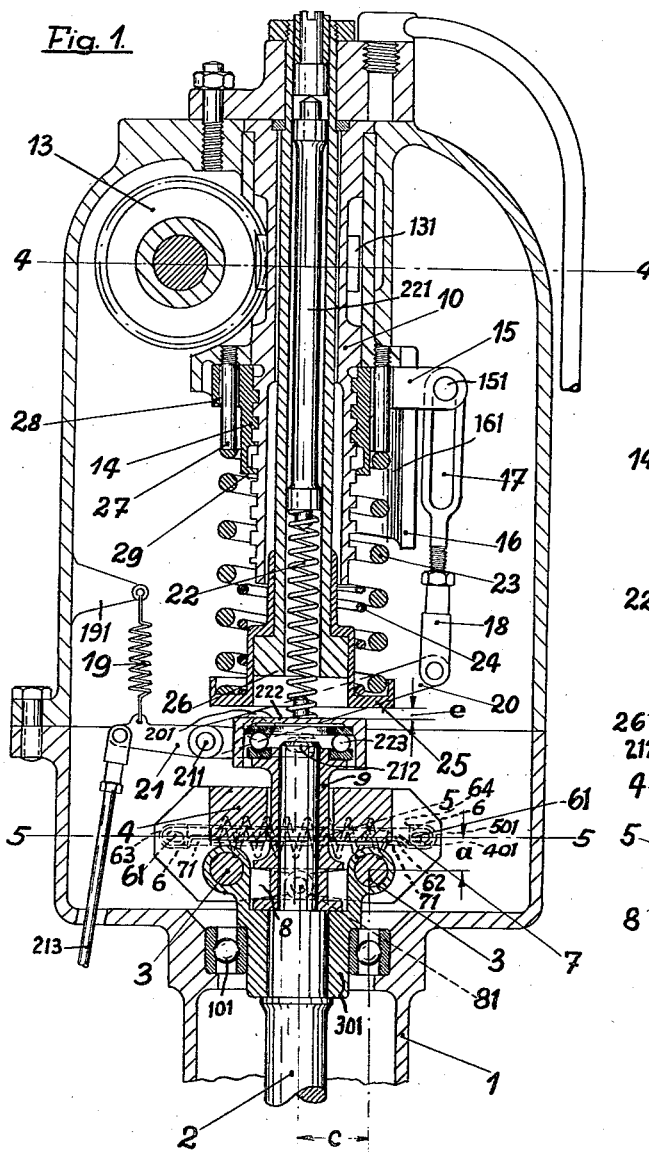
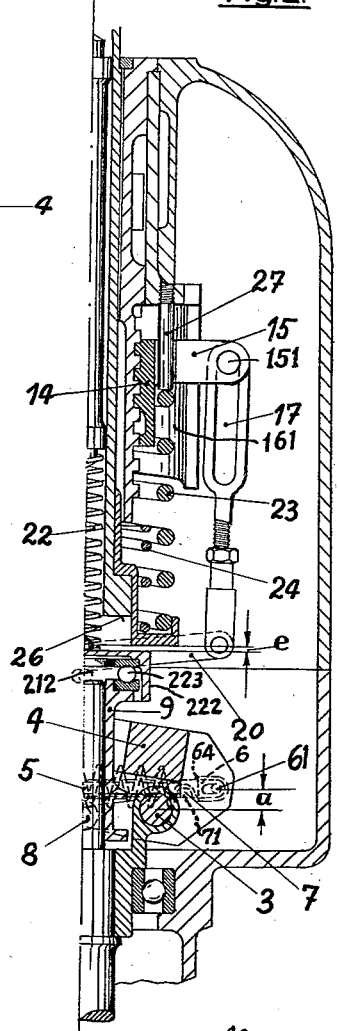
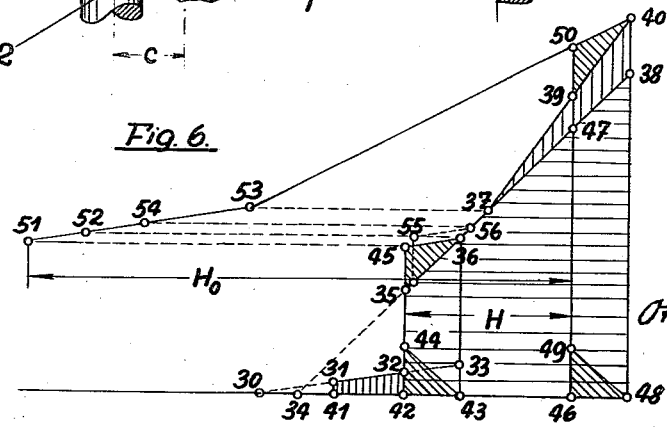
Inventor
Otto Schilling May 23, 1939.　　　　O. SCHILLING　　　　2,159,863
ENGINE GOVERNOR
Filed Feb. 21, 1935　　　3 Sheets-Sheet 2
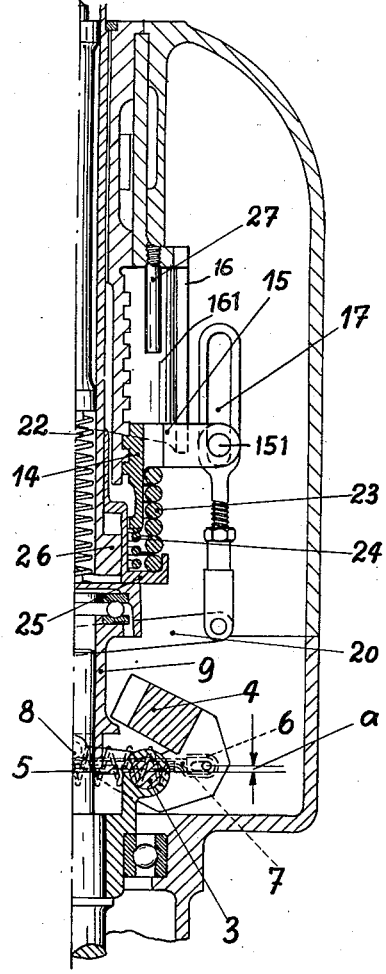
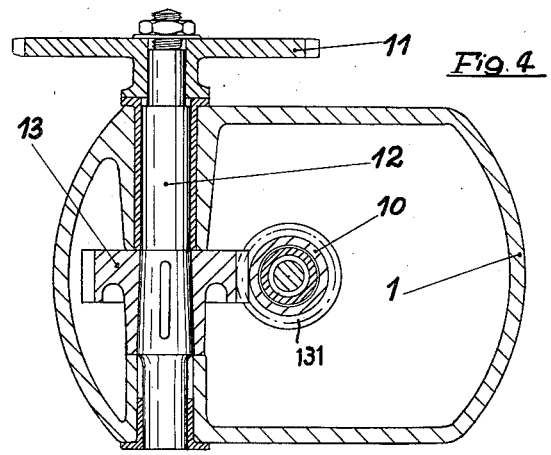
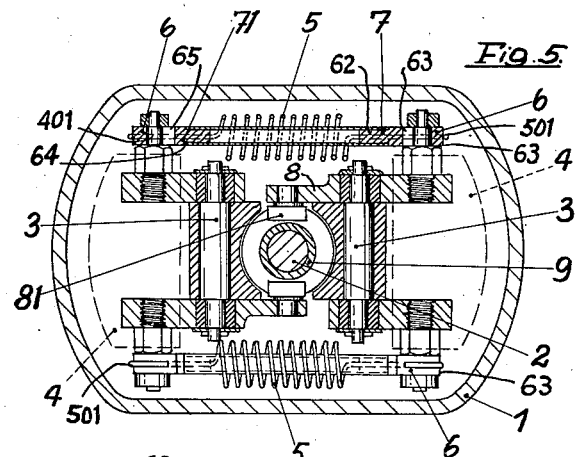
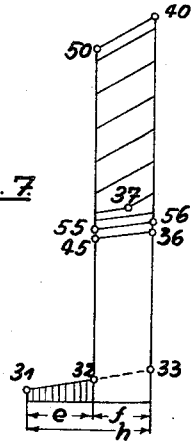
Inventor
Otto Schilling

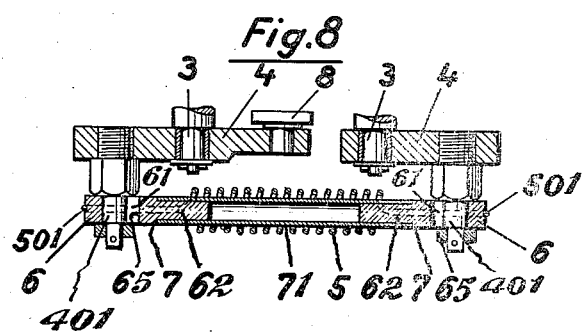
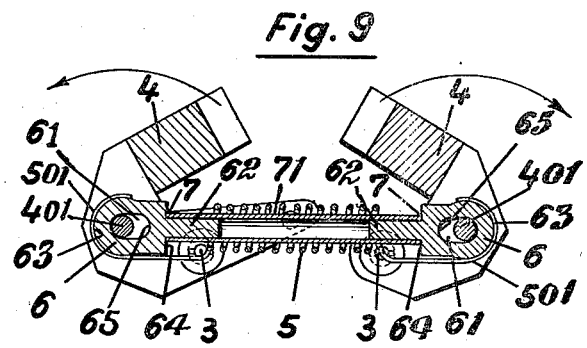
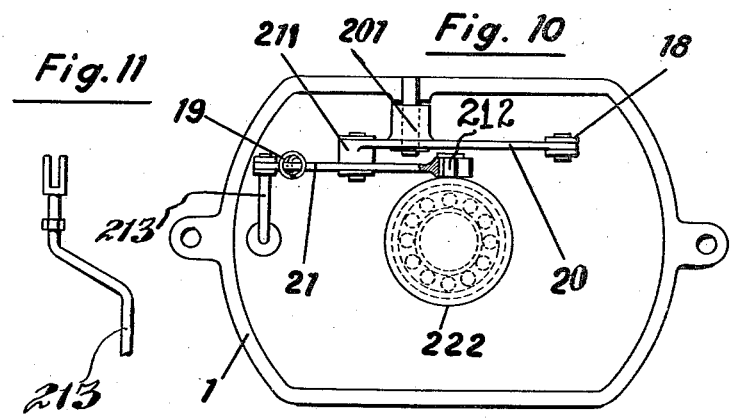

Patented May 23, 1939

2,159,863

UNITED STATES PATENT OFFICE 2,159,863

ENGINE GOVERNOR

Otto Schilling, Stuttgart-Unterturkheim, Germany, assignor to Daimlerbenz Aktiengesellschaft Stuttgart-Unterturkheim, Germany Application February 21, 1935, Serial No. 7,654

17 Claims. (Cl. 264—3)

The present invention relates to centrifugal governors having an adjustable speed range.

One object of the invention is to provide a governor in which the speed range can be adjusted within wide limits.

Another object of the invention is to provide a governor which will provide satisfactory control of the quantity of fuel injected by the fuel injection apparatus in internal combustion engines of the liquid injection compression ignition type.

Spring-loaded centrifugal governors having means for enabling the force of the spring to be adjusted, as previously proposed, are unsuitable for the objects above referred to, since if a soft spring is provided the amount of displacement of the ends of the spring relatively to one another would in certain circumstances be so great that difficulties would arise in respect to the arrangement and dimensions of the parts of the governor, even if the required range of regulation could be covered at all. If a hard spring were employed, the governor would not be sufficiently sensitive and would not fulfil its purpose.

In accordance with the invention, at least two governor springs are provided, one of which is adjustable during the running of the governor for varying its initial force, the governor springs at all settings of the governor acting in the same sense on the movable parts of the governor controlled by them and at least one of the springs exerting an increasing resistance and at least one other a decreasing resistance as the deflection of the governor increases.

In the preferred embodiment of the invention, the spring or springs acting with increasing resistance exert on the governor a relatively steeply rising resistance and the spring or springs acting with decreasing resistance exert a less steeply falling resistance, so that in the aggregate a relatively only slightly increasing resistance or regulation characteristic results. The adjusting device preferably acts on the spring or springs having the steeply rising resistance.

The governor according to the invention is particularly suitable for governing the engines of power driven vehicles, especially rail motor coaches, since the governor can be adjusted over a wide speed range.

The new governor combines the advantages of a soft governor spring and a hard governor spring without their disadvantages, the arrangement being such that the action of the governor on the part controlled by it, such as the fuel pump, is equivalent to that produced by means of a soft governor spring, while for adjusting the speed range of the governor, only a relatively small setting movement is required such as would be required in the case of a hard spring. This result is due to the differential action of two relatively hard governor springs which produces a result equivalent to that of a single soft governor spring, whereas for setting the speed range by hand or otherwise only one of the springs need be adjusted, which being relatively hard does not require any considerable displacement of the adjusting member. By this means it is possible to obtain any desired softness of the resultant spring action with springs of any desired softness while enabling the governor to cover a very large speed range.

If the spring having the steeply rising characteristic be the one that is adjusted for varying the setting of the governor, an extremely short adjusting movement only will be required and the adjustment of such spring can be effected more simply and conveniently than that of a spring having a decreasing resistance characteristic.

The spring or springs having the decreasing characteristic may be connected to the governor weights, so as to act in tension, in the vicinity of the connecting line drawn through the pivotal axes of the weights, so that the lever arm which acts to resist the displacement of the governor weights decreases as the governor deflection increases and when the weights are fully displaced the line of action of the spring or springs passes through or approximately through the pivotal axes of the weights. This arrangement gives the most favourable regulation characteristic. Moreover, any adjustment of the tension of the spring or springs arranged in this manner would only vary the steepness of the decreasing characteristic of the spring or springs without affecting the speed range and for this reason also it is desirable for the spring having the steeply rising characteristic to be the one to be adjusted for varying the setting of the governor. For completing the regulation, a separate idle-running spring device of a known kind may be provided.

A preferred embodiment of the invention is illustrated in the accompanying drawings.

Fig. 1 shows the governor in vertical section in the stop position,

Fig. 2 is a half vertical section of the governor in the idle running position,

Fig. 3 is a similar view to Fig. 2 showing the governor in the full load position.

Fig. 4 is a horizontal section on the line 4—4 of Fig. 1,

Fig. 5 is a horizontal section on the line 5—5 of Fig. 1,

Fig. 6 is a diagram illustrating the characteristics of the governor springs,

Fig. 7 is a diagram showing the regulation characteristic of the member controlled by the governor at different settings of the governor springs.

Fig. 8 is a horizontal section similar to Fig. 5 illustrating some of the details thereof, Fig. 9 is a vertical section of the parts shown in Fig. 8, Fig. 10 is an elevation showing the mounting of the levers controlled by the governor, Fig. 11 is a side view of the throttle control member.

In the governor casing 1 is journalled in a ball bearing 101 the governor spindle 2 which supports the centrifugal weights 4, which are mounted on pivots 3 carried by a collar member 301 fixed to the spindle 2. Each of the weights 4 has a stud 401 projecting laterally therefrom, which passes through a slot 61 in a sliding member 6. Each sliding member 6 is provided with a shank 62 which slidably fits inside a tube 71, the slot 61 being provided in a flattened part having a rounded end 65. The sliding members are urged towards one another by means of a tension spring 5, the ends 501 of which are passed around the rounded ends 63 of members 6, the inward movement of the members 6 towards one another being limited by means of the shoulders 64 which are adapted to bear against the ends 7 of the tube 71. In Fig. 3 the weights 4 occupy an intermediate position in which the studs 401 bear against the outer ends of the slots 61, while in Fig. 1, in which the weights are in their innermost position, the studs bear against the ends 65 of the slots, so that before the spring 5 can have any influence on the weights the studs have to travel a distance equal to the amount of play permitted by the slots 61. On the weights swingng outwardly beyond the position shown in Fig. 3, the studs 401 force the sliding members 6 apart and expand the spring 5. During the inward movement of the governor weight, the spring 5 continues to act on the weights until the shoulders 64 bear against the ends 7 of the tube 71 when the weights move freely into their innermost position without being acted upon by the spring.

One of the governor weights is provided with a lever arm 8 on the end of which is mounted a roller 81 which engages in a circumferential groove in the governor sleeve 9 which is slidable on the reduced end of the governor spindle 2, the sleeve 9 being operatively connected to the control member of the fuel injection apparatus as hereinafter described. In the upper part of the casing 1 is rotatably mounted a sleeve 10 which can be turned by means of a sprocket wheel 11 fixed on a shaft 12, through the intermediary of a worm gear 13 fixed to the shaft 12 and meshing with a gear wheel 131 fixed on the sleeve. The lower part of the sleeve 10 is provided with threads on which a nut 14 is threaded, the latter having an arm 15 which is guided in a slot 16 in a part 161 of the casing 1, whereby the nut 14 is prevented from turning. The arm 15 is operatively connected through the intermediary of a link member 18 to a two-armed lever 20, the link member having a slot 17 which is engaged by a stud 151 on the lever 15. The lever 20 is pivotally mounted on a stud 201 fixed on the inside of the casing 1. A double lever 21 is pivoted on a stud 211 carried by the free end of the lever 20, the right hand arm of the lever 21 being forked and straddling a stud 212 on the governor sleeve 9. The left hand arm of the lever 21 has pivoted to it a control rod 213 and in proximity of the pivotal point of the control rod a tension spring 19 is attached to one end to the lever 21, the other end of said tension spring being attached to a lug 191 arranged on the inside of the casing 1, the spring 19 forcing the lever 20 to depress the link 18 so that the upper end of the slot 17 bears against the stud 151.

In the stop position of the parts shown in Fig. 1 in which the nut 14 is in its highest position and in the idle running position in which the nut has been lowered into the position shown in Fig. 2, the upper end of the governor sleeve 9 is only acted on by the idle running spring 22 which bears at its upper end against the lower end of an abutment rod 221 and at its lower end against an abutment disc 222 which is rotatable with respect to the governor spindle 2 and bears against the latter through the intermediary of a ball thrust bearing 223. In addition to the idle running spring, two springs 23 and 24 are provided which bear at their lower ends against a plate 25 the downward movement of which is limited by means of a fixed stop member 26, so that in the stop position and idle running position the plate 25 is spaced by a distance e from the abutment disc 222. The upper end of the spring 23 bears against fixed abutment pins 27 which maintain the spring under initial compression in the stop and idle running positions. The abutment pins 27 are not essential, however, and may be omitted.

On rotating the sprocket wheel 11 from the stop position to the idle running position, the nut 14, which is provided with abutment members 28 for engaging the upper end of the spring 23, is lowered into the position shown in Fig. 2 but the abutment members 28 are still out of engagement with the end of the spring 23. This movement of the sprocket wheel therefore merely serves for actuating the control rod 213 for allowing fuel to be admitted to the engine, the downward movement of the nut permitting the rod 18 to be lowered and the lever 21 to turn clockwise, raising the rod 213. The adjustment of the governor springs is not affected by this movement since only the idle running spring 22 is effective. On the sprocket wheel 11 being further rotated, the nut 14 is lowered to such an extent that the stops 28 engage the spring 23 and place it under increased stress, the admission of fuel to the engine being at the same time increased owing to the rod 213 being further raised as the link 18 is lowered. On the nut 14 being lowered still further, its lower end which is inwardly flanged bears against the upper end of the spring 24 the lower end of which bears against the plate 25 and places this spring also under stress as shown in Fig. 3. By this time the rod 213 has moved into the full delivery position and the link 18 has moved into its lowest position and any further downward movement of the nut 14 is without any corresponding action on the rod 213 and the stud 151 slides downwardly in the slot 17. Fig. 3 thus shows the parts in the full load position. The idle running spring 22 is sufficiently weak to allow the governor weights to swing out when the speed rises above the idle running speed, so that by the time the nut 14 has moved into the position shown in Fig. 3 the abutment disc 222 has risen into contact with the plate 25 and both the springs 23 and 24 now oppose the further upward movement of the governor sleeve 9, as well as the idle running spring 22 and the springs 5, one of which is provided on each side of the governor weights, as shown in Fig. 5. The location of the studs 401 with respect to the ends of the slots 61 is preferably such that when the abutment disc 222 makes contact with the plate 25 the studs 401 bear against the outer ends of the slots 61, as shown in Figures 3 and 9, so that any further outward movement of the governor weights will move the sliding members 6 apart, placing the springs 5 under tension.

In Fig. 6, the characteristics of the individual governor springs in their action on the governor sleeve 9 are shown, the load on the springs being plotted as ordinates against the displacement of the governor sleeve 9 as abscissae. The straight line 30—31—32—33 is the diagram of the idle running spring 22, the straight line 34—35—36—37—38 the diagram of the spring 23 and the straight line 37—39—40 (plotted above 37—38 as a base) that of the spring 24, so that the diagram 34—37—40 is the resultant characteristic of the two springs 23 and 24.

Let it be assumed that, at the moment when the abutment disc 222 of the governor sleeve 9 comes into contact with the plate 25, the spring 23 is under the initial stress indicated by the point 35, while the idle running spring 22 is under the stress indicated by the point 32. Let it be further assumed that the total governor deflection, or the total displacement of the governor sleeve 9, which is available for effecting the regulation is $h=41$—$43$, comprising an idle running lift $e=41$—$42$ during which only the idle running spring is effective and a working lift $f=42$—$43$ during which the spring 23 is also effective. From 41 to 42 the stress in the idle running spring increases from 31 to 32 and from the point 42 to the point 43 the stress in the idle running spring increases from 32 to 33 but the effect of the idle running spring is so small that it may be disregarded for the sake of clearness from the point 42 to the point 43, during which portion of the lift the stress in the spring 23 increases from 35 to the maximum represented by the point 36. In addition to the spring 23, the springs 5 between the governor weights also come into action approximately at the point 42.

The action of the springs 5 is controlled by the proper selection of the scale of the spring, the distance between the spring axis and the governor pivot axis and the range of angular movement of the weights.

As will be seen from Fig. 1, the ends of the tension springs act on the governor weights at points situated above and outside the pivots of the weights, so that as the weights move outwardly the line of action of the springs is lowered until in the extreme outward position of the governor weights the force exerted by the springs acts on a line situated only slightly above the pivotal axis of the weights and the lever arm $a$ by which the springs act on the weights 4 is reduced practically to zero. If $F_0$ denotes the spring tension at the position of minimum deflection of the governor sleeve, $P_0$ the force exerted by the springs 5 on the governor sleeve at the position in question and $r$ the length of the radial lines adjoining the points of application of the force of the springs to the pivotal axes of the weights, then $$P_0 = \frac{aF_0}{r}$$

As the weights move outwardly with increasing deflection of the governor, the spring tension increases but at the same time the axes of the springs 5 approach the pivots of the weights 4. If, when the governor deflection is zero, the points of application of the springs were vertically above the pivots 3 of the weights, then at any other governor deflection, the stress in the springs would be $$F_1 = F_0 + Cd$$
$$= F_0 + Cr \cos \alpha$$

where C is the spring constant and $\alpha$ the angle between the lines $r$ and the horizontal lines passing through the pivotal axes of the weights, $d$ being the spring deflection.

The moment of the springs about the pivots 3 of the weights for one weight at zero deflection of the governor would be $$M_0 = F_0 r \sin \alpha$$

and at any other deflection $$M_1 = F_1 r \sin \alpha$$
$$= r \sin \alpha (F_0 + Cr \cos \alpha)$$

The angle $\alpha$ decreases as the weights move outwardly and $\cos \alpha$ increases in value while $\sin \alpha$ decreases. The value $\sin \alpha \cos \alpha$ rises from zero at zero deflection of the governor weights to a maximum when $\alpha$ equals approximately 40° and then rapidly decreases again, being again zero when $\alpha$ equals zero degrees.

As will be seen from Fig. 1, however, at the minimum deflection of the governor the angle $\alpha$ is considerably less than 40°, so that the value $\sin \alpha \cos \alpha$ decreases as the weights 4 move outwardly and the springs 5 gradually become less effective in opposing movement of the governor sleeve. That is to say the force exerted on the governor sleeve 9 decreases with increasing deflection of the governor and the more the axes of the springs 5 approach the pivots 3 of the weights 4. In Fig. 6 the characteristic of the springs 5 is indicated by the straight line 44—43. In Fig. 6, the residual force exerted by the springs 5 at the extreme outward position of the governor weights is neglected, since this force is negligible owing to the very small leverage $a$ in this position of the weights, as shown in Fig. 3.

Since the springs 5 and 23 act simultaneously in the same sense, their characteristics are additive and the sum of their characteristics 35—36 and 44—43 is represented by the straight line 45—36, which it will be seen is much flatter than the characteristic of the regulable spring 23. Thus a comparatively large movement of the governor sleeve is accompanied by only a small increase in the resultant spring force opposing the displacement of the governor sleeve, corresponding to the action of a weak governor spring.

If the nut 14 is lowered below the full load position through a distance H, the spring 23 is subjected to an initial stress represented by the ordinate 46—47 and the force exerted by the spring 24 is increased by an amount equal to 47—39. The working governor deflection $f$ is now represented by the horizontal distance 46—48. By adding the unchanged characteristic $$49\text{—}48 = 44\text{—}43$$

of the tension springs 5 to the resultant characteristic 39—40 of the two springs 23, 24, the characteristic of the idle running spring being again ignored, the resultant characteristic 50—40 of the springs 23, 24, 5 is obtained.

By varying the position of the nut 14 within the limits provided for and represented by the horizontal distance 42—48 any desired portion of the characteristics of the springs 23, 24 may be employed for producing the regulation. The diagram in Fig. 7 shows a succession of superposed resultant characteristics obtainable with the same governor deflection f from 45—36 to 50—40.

It will be seen from Figs. 6 and 7 that the spring 24 only comes into action above the point 37, so that it is obvious that by employing the springs 5 in conjunction with the spring 23 alone it is possible to cover with a relatively small range of adjustment H of the nut 14 a considerable range of adjustment of the speed of the governor with a flat characteristic corresponding to a soft governor spring. By employing two springs 23, 24, however, a resultant characteristic 34—37—40 is obtained which produces a more satisfactory regulation, the characteristic approximating to that of a parabola. It is obvious that by employing more than two springs 23, 24 a closer approximation could be obtained.

In Fig. 6 the line 51—52—53 represents the characteristic of a single spring and the line 51—52—53—50 the resultant of two springs corresponding to the springs 23, 24 and operating without the springs 5 for producing the required governor characteristic. To cover the same range of adjustment it would be necessary to provide an extremely large spring and the total range of adjustment H₀ of the nut 14 would have to be very considerable compared with the displacement required when the springs 5 are also employed. The portion 51—52 of the characteristic of the single spring would correspond to the portion 45—36 of the resultant characteristic of the springs 23, 24, the portion 52—54 to the portion 55—56 and the point 53 at which the second spring (corresponding to the spring 24) comes into action would correspond to the point 37 at which the second spring 24 comes into action. The advantages of the present invention will therefore be apparent without further explanation.

As an example of the apportionment of the total governor deflection, the idle running portion between the points 31 and 32 may correspond to a speed range of approximately 200 to 300 revs. per min. the full load portion between the points 45 and 40 to a speed range of from 1000 to 1700 revs. per min., the horizontal distance f for instance corresponding to a difference in speed of 70 revs. per min.

The nut 14 may be operatively connected to the engine fuel pump through the linkage 18, 20 and 21 in such a manner that on being lowered the pump is adjusted to its full load setting before the springs 23, 24 are put under stress.

The nut 14, it will be observed, not only serves for adjusting the governor speed range but also adjusts the pump delivery, so that by the actuation of the sprocket wheel 11, the pump delivery is changed over from zero in the stop position through the idle running setting to the full load setting, subsequent actuation of the sprocket wheel varying the speed range of the governor. By combining the fuel supply control member with the means for adjusting the governor to suit the load on the engine, the control of the engine is simplified, the provision of such an arrangement being facilitated by the small amount of displacement of the nut 14 required for adjusting the speed range of the governor.

I claim:

1. A speed governor of the centrifugal type comprising in combination, a driving shaft, a governor sleeve on the driving shaft, governor weights the position of which varies in relation to the speed of the driving shaft, a spring offering an increasing resistance to the displacement of the governor sleeve when the speed of the shaft increases, a second counteracting regulating spring connected immediately with the governor weights offering a decreasing resistance to the displacement of the governor weights when the speed of the shaft increases, and means by which the resistance of one of the two regulating springs acting at the same position of the regulating sleeve can be varied independently.

2. A speed governor of the centrifugal type comprising in combination, a driving shaft, a governor sleeve on the driving shaft, governor weights the position of which varies in relation to the speed of the driving shaft, a spring offering an increasing resistance to the displacement of the governor sleeve when the speed of the shaft increases, a second counteracting regulating spring connected immediately with the governor weights offering a decreasing resistance to the displacement of the governor weights when the speed of the shaft increases, and means by which the resistance of one of the two regulating springs acting at the same position of the regulating sleeve can be independently varied the resistance of which increases with increasing speed of the shaft.

3. A speed governor of the centrifugal type comprising in combination, a driving shaft, a governor sleeve on the driving shaft, governor weights the position of which varies in relation to the speed of the shaft, a spring offering a steeply increasing resistance to the displacement of the governor sleeve when the speed of the shaft increases, a second counteracting regulating spring connected immediately with the governor weights offering a slowly decreasing resistance to the displacement of the governor weights when the speed of the shaft increases, and means for independently varying the resistance of that regulating spring acting at the same position of the regulating device and the resistance of which increases with increasing speed of the shaft.

4. A speed governor of the centrifugal type comprising in combination, a driving shaft, a governor sleeve on the driving shaft, governor weights the position of which varies in relation to the speed of the shaft, a spring offering an increasing resistance to the displacement of the governor sleeve when the speed of the shaft increases, a second counteracting regulating spring connected immediately with the governor weights offering a decreasing resistance to the displacement of the governor weights when the speed of the engine increases, and means by which the resistance of one of the two regulating springs acting at the same position of the regulating device can be independently varied, and a third spring offering an increasing resistance to the regulation sleeve operably arranged to act when the first of said springs has reached a certain higher resistance.

5. A speed regulator of the centrifugal type comprising, a driving shaft, a governor sleeve on the driving shaft, governor weights the position of which varies in relation to the speed of the driving shaft, a spring offering an increasing resistance to the displacement of the governor sleeve when the speed of the shaft increases, a second counteracting regulating spring connected immediately with the governor weights offering a decreasing resistance to the displacement of the governor weights when the speed of the shaft increases, and means by which the resistance of one of the two regulating springs acting at the same position of the regulating device can be independently varied, stops adapted to prevent the action of the first of said springs upon the displacement of the regulating device when the speed of the shaft becomes too slow, and a further spring by which the regulation sleeve is loaded when the speed drops below said range of speed.

6. A speed governor of the centrifugal type comprising in combination, a driving shaft, a governor sleeve on the driving shaft, pivotally mounted governor weights the position of which varies in relation to the speed of the shaft, a spring offering an increasing resistance to the displacement of the governor sleeve when the speed of the shaft increases, a second counteracting regulating spring connected immediately with the governor weights offering a decreasing resistance to the displacement of the governor weights when the speed of the shaft increases, and means by which the resistance of one of the two regulating springs acting at the same position of the regulating sleeve can be independently varied, the second spring being actuated by a lever the length of which decreases with increasing speed of the shaft, by the approaching of the spring pivot axis to a horizontal line passing through the weight pivots thereby exercising a decreasing resistance upon said weights so that in the aggregate a relatively slight increasing resistance characteristic results.

7. A speed governor of the centrifugal type, comprising in combination, a driving shaft, a governor sleeve on the driving shaft, two governor weights supported by said shaft and adapted to swing about pivots the axis of each being disposed below said weights, said weights being movable in opposite directions and the position of said weights varying in relation to the speed of the driving shaft, a spring acting on said weights outside of said pivots tending to retract said weights in such a manner that when the weights swing out the distance of the acting axis of said spring from the pivots of the weights decreases substantially by the approaching of the spring pivot axis to a horizontal line passing through the weight pivots, a group of springs offering steeply increasing resistance to the displacement of the governor sleeve when the speed of the shaft increases, so that in the aggregate a relatively slight increasing resistance characteristic results, and means by which the resistance of the said group of springs can be continuously varied independently of said first mentioned spring.

8. A speed governor of the centrifugal type, comprising in combination, a driving shaft, a governor sleeve on the driving shaft, two governor weights supported by said shaft and adapted to swing about pivots the axis of each being disposed below said weights, said weights being movable in opposite directions and the position of said weights varying in relation to the speed of the driving shaft, a spring acting on said weights outside of said pivots tending to retract said weights in such a manner that when the weights swing out the distance of the acting axis of said spring from the pivots of the weights decreases substantially by the approaching of the spring pivot axis to a horizontal line passing through the weight pivots, stops so arranged that when the weights are swung to the governor shaft further action of said spring is prevented, a group of springs offering steeply increasing resistance to the displacement of the governor sleeve when the speed of the shaft increases, so that in the aggregate a relatively slight increasing resistance characteristic results, and means by which the resistance of the said group of springs can be continuously varied independently of said first mentioned spring.

9. A speed governor of the centrifugal type comprising in combination, a driving shaft, a governor sleeve on the driving shaft, governor weights supported by the driving shaft and adapted to swing about pivots the axis of each being disposed below said weights, said weights acting in opposite directions, the position of said governor weights varying in relation to the speed of the driving shaft, a group of springs offering an increasing resistance to the displacement of the governor sleeve when the speed of the engine increases, a second sleeve determining the tension of one of said regulating springs, said sleeve being axially displaceable and secured against turning and provided with threads, a pinion provided with screw threads rotatably mounted but secured against any axial displacement, the threads of the sleeve and the threads of said pinion engaging one another, a device provided with teeth and engaging said pinion, said device being adapted to turn said pinion, a second spring acting on said governor weights outside of said pivots tending to retract said weights in such manner that when the weights swing out the distance of the acting axis of said second mentioned spring from the pivots of the weights decreases substantially by the approaching of the spring pivot axis to a horizontal line passing through the weight pivots so that in the aggregate a relatively slight increasing resistance characteristic results.

10. A speed governor of the centrifugal type comprising in combination, a driving shaft, a governor sleeve on the driving shaft, governor weights supported by the driving shaft and adapted to swing about pivots the axis of each being disposed below said weights, said weights acting in opposite directions, the position of said governor weights varying in relation to the speed of the driving shaft, a group of springs offering an increasing resistance to the displacement of the governor sleeve when the speed of the engine increases, a second sleeve arranged for regulating the tension of one of said springs, said sleeve being axially displaceable and provided with a collar which serves as a rest for said spring, stops reaching through said collar adapted to prevent further detention of said spring when the spring has been slightly detended so that the sleeve moves freely back on its further stroke, a second spring acting on said governor-weights outside of said pivots tending to retract said weights in such a manner that when the weights swing out the distance of the acting axis of said second spring from the pivots of the weights decreases substantially by the approaching of the spring pivot axis to a horizontal line passing through the weight pivots so that in the aggregate a relatively slight increasing resistance characteristic results.

11. A speed governor of the centrifugal type comprising in combination, a driving shaft, a governor sleeve on the driving shaft, governor weights supported by the driving shaft adapted to swing about pivots the axis of each being disposed below said weights, said weights acting in opposite directions, the position of the governor weights varying in relation to the speed of the driving shaft, a spring offering an increasing resistance to the displacement of the governor sleeve when the speed of the shaft increases, a regulating sleeve determining the tension of said spring, said sleeve being axially displaceable and secured against turning and provided with a thread, an abutment engaged by said spring shiftably mounted, a stop for said abutment which is pressed against said spring in such a manner that the abutment when the regulating sleeve is displaced is kept by regulating sleeve and against the action of the spring will be cut off from the stop, a further fixed stop abutting the spring at its other end and a further shiftably mounted spring rest displaceable in the direction of the spring axis, said end of the spring cutting off from its stop and adapted to vary the preliminary tension of the spring during the operation of the sleeve, a further spring acting on the governor weights and retracting said weights outside the pivots of the weight-lever in such a manner that when the weights swing out the distance of the acting axis of said second spring from the pivots of the weights decreases substantially by the approaching of the spring pivot axis to a horizontal line passing through the weight pivots so that in the aggregate a relatively slight increasing resistance characteristic results.

12. A speed governor of the centrifugal type comprising in combination, a driving shaft, a governor sleeve on the driving shaft, governor weights supported by the driving shaft adapted to swing about pivots the axis of each being disposed below said weights, said weights acting in opposite directions, the position of the governor weights varies relatvely to the speed of the driving shaft, a spring offering an increasing resistance to the displacement of the governor sleeve when the speed of the shaft increases, a regulating sleeve determining the tension of said spring, said regulating sleeve being axially displaceable and secured against turning and provided with a thread, an abutment engaged by said spring shiftably mounted, a stop for said abutment which is pressed against said spring in such manner that the abutment when the regulating device is displaced is kept by the regulating sleeve and against the action of the spring will be cut off from the stop, a further fixed stop abutting the spring at its other end and a further shiftably mounted spring rest displaceable in the direction of the spring axis, said end of the spring cutting off from its stop and adapted to vary the preliminary tension of the spring during the operation of the sleeve, a further spring acting the governor weights and retracting said weights outside the pivots of the weight-lever in such a manner that when the weights swing out the distance of the acting axis of said second spring from the pivots of the weights decreases substantially by the approaching of the spring pivot axis to a horizontal line passing through the weight pivots so that in the aggregate a relatively slight increasing resistance characteristic results, a further regulating spring disposed parallel to the first mentioned spring, said further spring abutting with its end against the first mentioned abutment of the spring normally being without preliminary tension said further spring being kept by the second spring abutment only when the latter has been shifted and put under preliminary tension.

13. A speed governor of the centrifugal type comprising in combination, a driving shaft, a governor sleeve on the driving shaft, governor weights supported by the driving shaft adapted to swing about pivots, the axis of each being disposed below said weights, said weights acting in opposite directions, the position of the governor weights varying in relation to the speed of the driving shaft, a first spring offering an increasing resistance to the displacement of the governor sleeve when the speed of the shaft increases, a regulating sleeve determining the tension of said spring, said sleeve being axially displaceable and secured against turning and provided with a thread, an abutment engaged by said spring shiftably mounted, a stop for said abutment which is pressed against said spring in such manner that the abutment when the regulating device is displaced is kept by the regulating sleeve and against the action of the spring will be cut off from the stop, a further fixed stop abutting the spring at its other end and a further shiftably mounted spring rest displaceable in the direction of the spring axis, said end of the spring cutting off from its stop and adapted to vary the preliminary tension of the spring during the operation of the sleeve, a further spring acting on the governor weights and retracting said weights outside the pivots of a weight-lever in such a manner that when the weights swing out the distance of the acting axis of said second spring from the pivots of the weights decreases substantially by the approaching of the spring pivot axis to a horizontal line passing through the weight pivots so that in the aggregate a relatively slight increasing resistance characteristic results, further device for varying the amount of fuel to be supplied to an engine, said device being connected with said second spring abutment and acted upon when the latter is shifted.

14. A speed governor of the centrifugal type comprising in combination, a driving shaft, a governor sleeve on the driving shaft, governor weights supported by the driving shaft adapted to swing about pivots, the axis of each being disposed below said weights, said weights acting in opposite directions, the position of the governor weights varying in relation to the speed of the driving shaft, a spring offering an increasing resistance to the displacement of the governor sleeve when the speed of the engine increases, a regulating sleeve determining the tension of said spring, said regulating sleeve being axially displaceable and secured against turning and provided with threads, an abutment engaged by said spring shiftably mounted, a stop for said abutment which is pressed against said spring in such manner that the abutment when the regulating device is displaced is kept by the regulating sleeve and against the action of the spring will be cut off from the stop, a further fixed stop abutting the spring at its other end and a further shiftably mounted spring rest displaceable in the direction of the spring axis, said end of the spring cutting off from its stop and adapted to vary the preliminary tension of the spring during the operation of the sleeve, a further spring acting on the governor weights and retracting said weights outside the pivot of a weight-lever in such a manner that when the weights swing out the distance of the acting axis of said second spring from the pivots of the weights decreases substantially by the approaching of the spring pivot axis to a horizontal line passing through the weight pivots so that in the aggregate a relatively slight increasing resistance characteristic results, a further device for varying the amount of fuel to be supplied to an engine, said device being connected with said second spring abutment in such manner that upon shifting the abutment in the direction of an increasing spring tension the amount of fuel supplied to the engine is increased before the spring is cut off from its stop.

15. A speed governor of the centrifugal type comprising in combination, a driving shaft, a governor sleeve on the driving shaft, governor weights supported by the driving shaft adapted to swing about pivots, the axis of each being disposed below said weights, said weights acting in opposite directions, the position of the governor weights varying in relation to the speed of the driving shaft, a spring offering an increasing resistance to the displacement of the governor sleeve when the speed of the engine increases, a regulating sleeve determining the tension of said spring, said regulating sleeve being axially displaceable and secured against turning and provided with threads, an abutment engaged by said spring shiftably mounted, a stop for said abutment which is pressed against said spring in such a manner that the abutment when the regulating device is displaced is kept by the regulating sleeve and against the action of the spring will be cut off from the stop, a further fixed stop abutting the spring at its other end and a further shiftably mounted spring rest displaceable in the direction of the spring axis, said end of the spring cutting off from its stop and adapted to vary the preliminary tension of the spring during the operation of the sleeve, a further spring acting on the governor weights and retracting said weights outside the pivots of a weight-lever in such a manner that when the weights swing out the distance of the acting axis of said second spring from the pivots of the weights decreases substantially by the approaching of the spring pivot axis to a horizontal line passing through the weight pivots so that in the aggregate a relatively slight increasing resistance characteristic results, an idler spring constantly abutting against the regulating device and influenced by the regulating device.

16. A speed governor of the centrifugal type comprising in combination, a driving shaft, a governor sleeve on the driving shaft, governor weights adapted to swing about pivots, the axis of each being disposed below said weights, said weights acting in opposite directions, the position of the governor weights varying in relation to the speed of the driving shaft, a spring offering an increasing resistance to the displacement of the governor sleeve when the speed of the engine increases, a regulating sleeve determining the tension of said spring, said regulating sleeve being axially displaceable and secured against turning and provided with threads, an abutment engaged by said spring shiftably mounted, a stop for said abutment which is pressed against said spring in such a manner that the abutment when the regulating device is displaced is kept by the regulating sleeve and against the action of the spring will be cut off from the stop, a further fixed stop abutting the spring at its other end and a further shiftably mounted spring rest displaceable in the direction of the spring axis, said end of the spring cutting off from its stop and adapted to vary the preliminary tension of the spring during the operation of the sleeve, a further spring acting on the governor weights and retracting said weights outside the pivots of a weight-lever in such a manner that when the weights swing out the distance of the acting axis of said second spring from the pivots of the weights decreases substantially by the approaching of the spring pivot axis to a horizontal line passing through the weight pivots so that in the aggregate a relatively slight increasing resistance characteristic results, an idler spring constantly abutting against the regulating sleeve, a lever connected to the regulating sleeve for varying the amount of fuel supply of an internal combustion engne and an adjusting device for varying the amount of fuel supply independently of said regulating sleeve, the device being arranged to actuate the means carrying the resistance of the regulating spring after initial actuation of the device for varying the amount of fuel independently of the regulation device.

17. A speed governor of the centrifugal type comprising in combination, a drive shaft, a governor sleeve on the drive shaft, pivots turning with the drive shaft, governor weights above the pivots adapted to swing out about said pivots when the speed of the drive shaft increases moving the governor sleeve in an upward direction, a horizontal spring acting on the governor weights and retracting the same outside the pivots of a weight lever in such manner that when the weights swing out the distance of the acting axis of said spring from the pivots of the weights decreases substantially and the power moment of the spring to the weights decreases by the approaching of the spring pivot axis to a horizontal line passing through the weight pivots so that in the aggregate a relatively slight increasing resistance characteristic results, a forked lever actuated by the governor sleeve, a spring for leading back the forked lever, a rod for varying a fuel supply actuated by the forked lever, a two arm lever connected with the forked lever pivotally mounted on a governor casing, a rod connected with the pivotally mounted lever, a slotted guide at the upper end of said rod, an abutment slidably mounted on a hollow stop, a regulating spring for the governor sleeve the lower end of which rests on said abutment, the other end of said spring abuts against upper stops fixed on a nut, a governor casing carrying a bushing in the upper part thereof, a sprocket rotatable in said bushing by means of a shaft having a worm wheel, the under part of said bushing having threads upon which said nut is fixed, said governor casing being provided with a slot for guiding said nut by means of an arm which engages the rod connected with the fork lever, a second regulating spring for the governor sleeve the lower end thereof abutting against the slidable abutment, the upper end of said spring being held at a distance from the upper stops in said nut, an idle spring in the bore of said hollow stop the lower end of which rests on the governor sleeve.

OTTO SCHILLING.